United States Patent [19]

Storey et al.

[11] Patent Number: 4,698,211

[45] Date of Patent: Oct. 6, 1987

[54] CATALYST INJECTION FOR ZIEGLER POLYMERIZATION

[75] Inventors: William R. Storey, Humble; William R. Wheat, Houston; Stuart B. Smith, Crosby, all of Tex.; Milind B. Ajinkya, Stanhope, N.J.

[73] Assignee: Exxon Chemical Patents Inc., Linden, N.J.

[21] Appl. No.: 766,999

[22] Filed: Aug. 19, 1985

[51] Int. Cl.$^4$ ............................................. B01J 14/00
[52] U.S. Cl. .................................... 422/135; 422/131; 422/136; 435/287
[58] Field of Search .................... 435/287; 426/11, 12; 422/131, 135, 136, 138

[56] References Cited

U.S. PATENT DOCUMENTS

| 3,003,986 | 10/1961 | Long | 422/135 X |
| 3,737,288 | 6/1973 | Hochman | 422/135 |
| 4,222,986 | 9/1980 | Smith | 422/135 X |

Primary Examiner—Alan Cohan
Attorney, Agent, or Firm—M. B. Kurtzman

[57] ABSTRACT

The fouling of the solid cocatalyst inlet nozzle in alpha-olefin Ziegler type polymerizations in stirred liquid phase, mass reaction is eliminated by positioning the inlet nozzle below the liquid surface on substantially the same horizontal plane as the bottom impeller and aligned with the impeller. The inlet nozzle extends from 30 to 80% of the distance between the wall of the reactor and the tip of the impeller. The ratio of the inlet velocity of the solid cocatalyst slurry to the reactor mass cross flow velocity is 2–3:1.

12 Claims, 2 Drawing Figures

CATALYST INJECTION FOR ZIEGLER POLYMERIZATION

BACKGROUND OF THE INVENTION

1. Field of the Invention

The present invention relates to apparatus and process for the polymerization of alpha-olefins using Ziegler type catalysts consisting of liquid and solid catalyst components whereby fouling resulting from solid cocatalyst injection is eliminated.

2. Related Art

In stirred liquid phase Ziegler polymerizations of alpha-olefins fouling of solid catalyst injection nozzles has been a continuing problem which reduces on stream time and requires periodic reactor shutdown to clear the nozzles. In order to minimize fouling the solid and liquid components of the Ziegler catalyst are fed separately, however, once both components are present together in the reaction zone the chance contact of the liquid cocatalyst component with the solid cocatalyst component exiting a nozzle or inlet is sufficient to result in polymer fouling of the nozzle. The liquid portion of Ziegler type catalyst does not present a fouling problem per se and is easily injected into the system.

Rapid dispersion of the solid cocatalyst within the reaction mass is the key to preventing fouling of the nozzle or reactor surfaces. It would appear that introduction of the solid cocatalyst below the liquid surface would provide the best means of obtaining this result except for the problem of fouling widely observed in the art in these systems.

Various approaches have been used to reduce or eliminate fouling of the solid cocatalyst nozzles. For example, mechanical roding devices are often employed, but are unsatisfactory since plugs are pushed into the reactor which cause downstream process and product problems. U.S. Pat. No. 3,285,900, Houser, et al. uses a continuous loop tubular reactor where the cocatalysts and reaction mass are continuously moved through the reaction zone in the highly turbulent flow range. U.S. Pat. No. 3,330,818, Derby, uses two opposed impellers each of which force the reaction mass toward the other with the inlet points for catalysts and reactants between the two opposed impellers. U.S. Pat. No. 3,694,423, Smith, et al. uses a loop reactor with a specific solid cocatalyst delivery system employing a plurality of transport zones and a reciprocating piston to force the solid cocatalyst into the polymerization zone. U.S. Pat. No. 3,726,845, Nickerson, inhibits plugging of the solid cocatalyst feed line by alternating catalyst slurry with diluent through the same line.

It is an advantage of the present invention that the solid cocatalyst slurry is fed below the liquid level of the reaction mass thereby avoiding "plating" of the reactor surface above the liquid surface, which occurs with vapor space feeding of the solid cocatalyst. It is a further advantage of the present invention that fouling of the solid cocatalyst feed line is eliminated. A particular feature of the present invention is that the solid cocatalyst slurry is fed continuously at the desired rate, thereby assuring a controlled and predictable Ziegler catalyst in the reaction mass at all times. These and other advantages and features of the present invention become apparent from the following disclosures.

SUMMARY OF THE INVENTION

Briefly, the present invention is an improvement in the apparatus and process for carrying out stirred liquid polymerization of alpha-olefins using Ziegler type catalysts and a method of eliminating fouling of the solid cocatalyst slurry feed nozzle.

The apparatus is a reactor for polymerization of alpha-olefins in liquid phase comprising a vessel having inlet means for reactants and cocatalysts, outlet means for polymer slurry, having one or more, preferably a plurality of impeller means arrayed along a vertical shaft centrally positioned in said vessel and rotatable therein by power means wherein the improvement is the positioning of a solid catalyst slurry inlet means on substantially the same horizontal plane as the bottom impeller means and extending into said vessel toward said impeller from about 30 to 80% of the distance from the vessel wall to the distal end of the impeller means. The vessel would preferably have a generally cylindrical configuration. The term "distal end of the impeller" is used herein to mean the tip of the impeller blade, i.e., the end distal to the shaft.

The solid cocatalyst inlet means may be positioned radially to the impeller means, tangentially thereto or at any position therein between, however, the radial positioning is preferred. The solid cocatalyst inlet means may be a nozzle having a heavy wall thickness for mechanical strength, which thickness is reduced toward the distal end thereof through which the slurry is discharged into the reaction in order to provide less surface area for potential sites for agglomeration of polymer or catalyst. The liquid cocatalyst component(s) of the Ziegler catalyst is fed to the reactor at a different location from the solid cocatalyst component. Each cocatalyst component is fed through a separate inlet. The location of any other cocatalyst feed inlet is not critical, however it is preferably located at least 90° away from the solid cocatalyst inlet and preferably on a different horizontal plane.

The present improved process of polymerization of alpha-olefins comprises contacting an alpha-olefin in liquid phase in a polymerization zone comprising a vessel having one or more, preferably a plurality of impeller means arrayed along a centrally located rotating vertical shaft, in the presence of a Ziegler type catalyst, at a polymerization temperature and pressure wherein the improvement comprises introducing a slurry of solid cocatalyst through an inlet (1) below the surface of the liquid on substantially the horizontal plane of the bottom impeller (2) at a velocity at least two times, preferably in the range of from two times to three times the angular velocity of the distal end of said impeller and (3) at a distance from the distal end of said impeller equal to 30 to 80% of the distance of said distal end of said impeller from the side of said vessel, thereby dispersing and mixing said solid catalyst and eliminating fouling of said inlet.

The present method of eliminating fouling of the inlet of a solid Ziegler type catalyst component comprises introducing the solid Ziegler type catalysts component in a slurry into a liquid reaction mass of alpha-olefin below the surface of the liquid reaction mass through an inlet on substantially the same horizontal plane as the bottom impeller of one or more, preferably a plurality of impellers arrayed along a vertical shaft centrally positioned in a vessel containing the reaction mass, at a velocity preferably in the range of from two times to three times the angular velocity of the distal end of said impeller and at a distance from the distal end of said impeller equal to 30 to 80% of the distance of said distal end of said impeller from the side of said vessel.

The distance of the slurried catalyst inlet from the tip of the impeller tip has been determined in conjunction with velocity to be that required for adequate dispersion of the solid catalyst in the reaction mass by the impeller action, without damage to the impeller blade, such as pitting by the solid particles and some adjustment within the ranges specified is recommended, such that higher inlet velocity would be used at the furthest location of the inlet from the impeller blade and the lower velocities used with the closer location of the inlet to the blade. The ratio of the solid cocatalyst inlet velocity : the reactor mass cross flow velocity should be in the range of 2 to 3:1. The reactor mass cross flow is the velocity of the reaction mass in the reactor, caused by the rotation of the impellers or agitators.

DETAILED DESCRIPTION OF THE INVENTION

Figure 1:
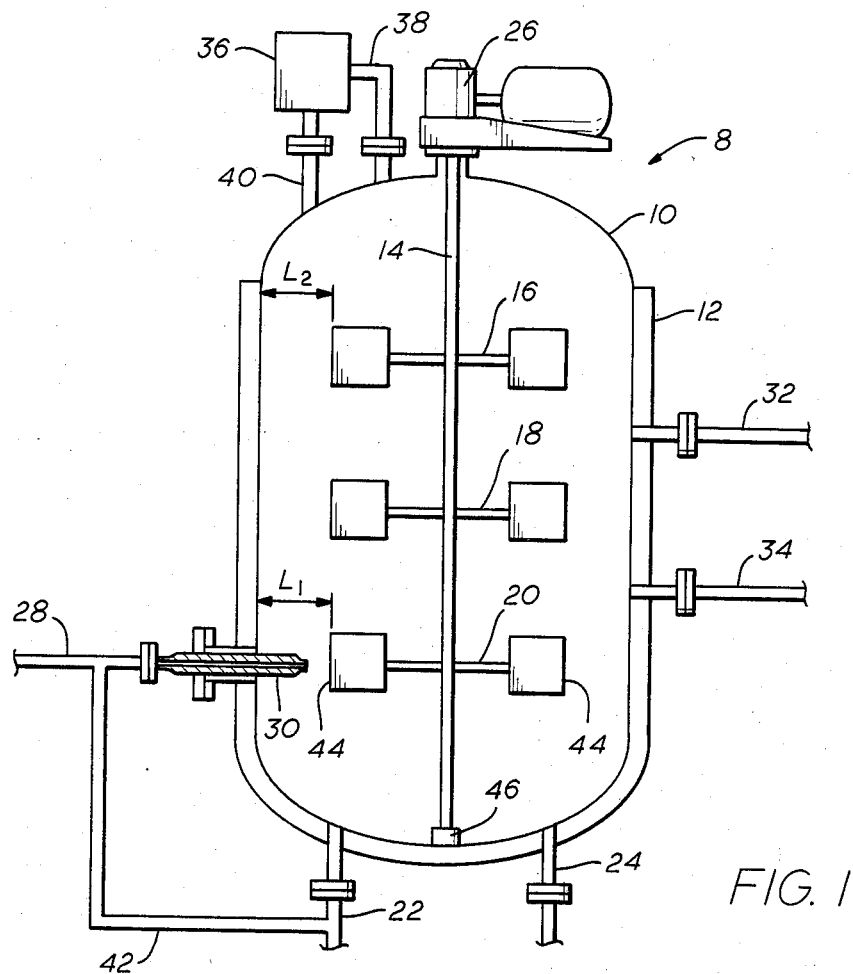
FIG. 1 is a cross sectional elevation of a reactor having the improvement of the present invention.

The present invention is applicable to the polymerization of alpha-olefins conducted in a polymerization which comprises a stirred reactor in which the stirring is obtained by a central rotating vertical shaft with one or more sets of blades or paddles, i.e., impellers positioned vertically along the shaft. The conventional stirred reactors have two or more sets of impellers, as a result of commercial sizing of reactors and engineering considerations on impeller design, however, a small reactor could be adequately agitated with a single impeller. The invention is particularly applicable to bulk or mass polymerization processes wherein the alpha-olefin monomer feed to the polymerization zone is ethylene, propylene, butene-1, pentene-1, hexene and the like. The reactions are in the liquid phase with temperatures and pressures adjusted to obtain this condition as well known in the art. In addition to the monomer there may be diluents, generally less than 50 weight %, present in the reaction mass.

The well known Ziegler type catalyst for polymerization of alpha-olefins as formed by combining an organo-metallic compound of a metal of Groups IIA, IIB and IIIA of the Periodic Table with a solid halide of a metal of Groups IVB, VB, or VIB of the Periodic Table are useful for polymerizing such olefins at low pressures and low temperatures to form resinous polyolefins. In preparing such catalysts, particularly suitable organic metallic compounds are the alkyl, especially the lower alkyl compounds of the metals of Groups IIA, IIB and IIIA, such as aluminum, zinc, cadmium and beryllium. Organometallic compounds in which the metal is attached to cycloalkyl radicals of three to seven carbon atoms or aromatic radical such as phenyl, as well as halogenated compounds such as dialkyl aluminum chlorides, are also suitable.

Some of the solid metal halides useful in preparing the aforementioned catalysts are the halides, particularly the chlorides and bromides of titanium, zirconium, vanadium, chromium, molybdenum and tungsten with titanium and vanadium trichlorides and tetrachlorides being preferred, as well as the oxyhalides of such metals including vanadium oxychloride, and complexes such as $AlCl_3 \cdot 2TiCl_3$.

As specific examples of suitable organometallic compounds useful in forming the aforementioned catalysts may be mentioned the dialkyl cadmiums such as diethylcadmium, dimethylcadmium and diisobutylcadmium, the dialkylzincs, such as diethylzinc, dibutylzinc, the trialkylaluminums and dialkylaluminum hydrides such as diisobutylaluminum hydride, diethylaluminum hydride, trimethylaluminum, triethylaluminum, tripropylaluminum, triisobutylaluminum and diethylaluminum chloride, the cycloalkyl metal compounds such as tricyclohexylaluminum, and the aryl metal compounds such as diphenylcadmium and dinaphthylzinc. The alkyl group on such compounds is advisably a lower alkyl and particularly such a group having one to four carbon atoms.

To minimize the likely fouling the two cocatalyst components are fed separately to the reaction mass and the catalyst formed in situ.

The titanium trichloride cocatalyst is employed in polymerization of alpha-olefins by contacting the same with an organometallic compound as described above.

The solid cocatalyst component is slurried in a suitable inert hydrocarbon material such as isooctane, n-heptane, xylene, or benzene and metered by appropriate equipment to the reactor.

In addition to the conventional Ziegler catalyst components, promoters, activators or the like may be added to the reaction.

FIG. 1 depicts the present reactor, which is comprised of a shell 10 with a jacket 12 which allows for cooling of the reaction mass since the polymerization is exothermic. The shell is generally cylindrical with shaft 14 centrally mounted through appropriate bearings and seals (not shown) in the top of the shell to be rotatable by power source 26 in the reactor 8 and conveniently mounted in bearing 46. Arrayed vertically along the shaft are three sets of impellers 16, 18 and 20. In addition to the shaft and impellers there may be baffles and/or scrapers in the reactor. Line 22 is the monomer feed line. A portion of the propylene feed is diverted via line 42 to mix with the slurry stream of solid cocatalyst. This expedient allows higher velocity for the stream without using a very small nozzle apperture which is likely to plug. The propylene also serves to wash the nozzle tip to aid in eliminating fouling. In one particular system employing the present invention, the monomer, propylene, was both the reactant and the reaction medium. The reaction is continuous and a slurry of polypropylene in propylene is removed via line 24 for further processing.

The solid cocatalyst is fed continuously to the reactor via line 28 and nozzle 30, which is mounted in the reactor through jacket 12 and shell 10 and extends into the reactor the distance $L_1$ on the same horizontal plane as the bottom impeller 20 toward the impeller which is $L_2$ distance from the side of shell 10 to the tip 44 of the impeller blade. The ratio $L_1/L_2 = 0.3$ to 0 8. The nozzle 30 in this embodiment lies on a radius of shaft 14.

Lines 32 and 34 are provided for liquid cocatalyst or promoter injection into the reactor. Other lines not shown may be provided for hydrogen (frequently used in olefin polymerizations to control molecular weight of the polymer) and for comonomer addition to the reactor.

The reactor is equipped with condenser 36 where propylene vapors leaving reactor 8 via line 38 are condensed and returned to the reactor via line 40.

Figure 2:
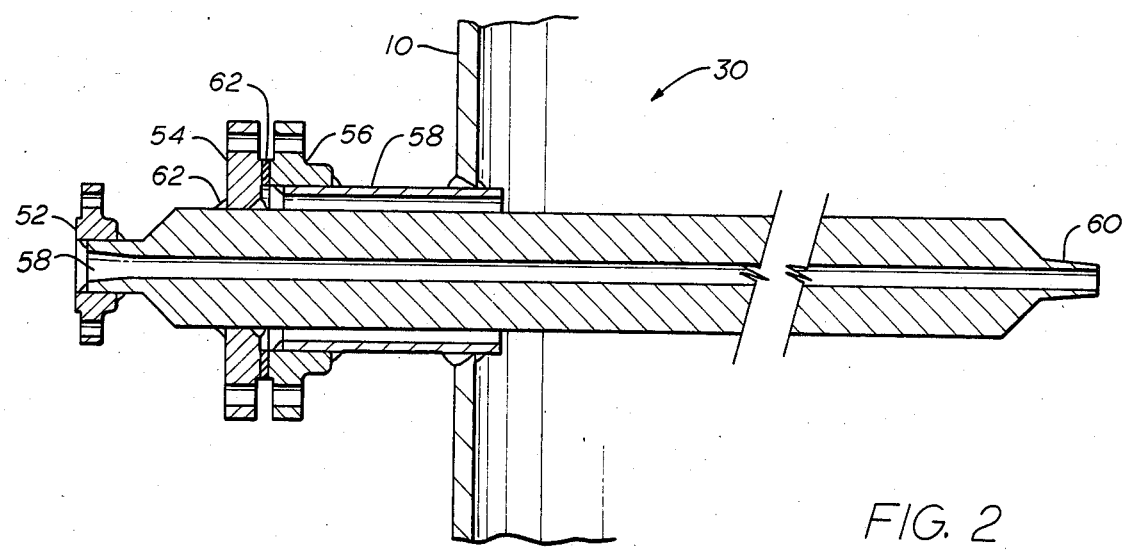
FIG. 2 is a cross sectional elevation of the nozzle used to inject solid catalyst slurry according to the present invention.

The nozzle 30 is shown in more detail in FIG. 2. The nozzle 30 has an elongated body which is generally thick through its major portion 50 for mechanical strength. Annular flange 54 is welded at 62 to the body 50 and adapted to cooperate with flange 56 welded to tube 58 which is attached (welded) to shell 10. An appropriate gasket 63 is located between the two flanges. The external end of nozzle 30 has annular flange 52 thereon to connect to a catalyst feed line 28. A bore 57 extends through the nozzle 30 which has a reduced size at its terminal end 60 in order to provide less surface area for possible fouling where the solid cocatalyst is most concentrated. This reduction in size of a small portion of the nozzle is not detrimental to the overall mechanical strength obtained by the girth of the major portion of the nozzle.

The present apparatus was used to polymerize propylene in a liquid phase bulk continuous reaction. In this system there is no diluent employed and propylene serves as the reaction medium, reactant and carrier for the polypropylene product. Propylene is fed continuously to reactor 8 via line 22. The catalyst system employed in this action contained two standard Ziegler components, i.e., a solid titanium chloride cocatalyst fed in a slurry of hexane and liquid propylene via line 28 and nozzle 30, and a liquid alkyl aluminum chloride component and a promoter which is a liquid ester of an unsaturated acid. The two liquid components are fed separately to the reactor through line 32 or 34. The location of these lines is not critical, and fouling is not associated with the entry point of liquid components. Predetermined but small amounts of hydrogen are also fed to the reaction to control the molecular weight and hence, the melt flow rate of the polymer product.

The nozzle 30 extended to within about 15 inches of the tip 44 of impeller 40. The diameter of conduit 58 is 0.375 inches. A propylene premix rate (via line 42) of 2,500 pounds/hr gave a catalyst jet velocity of 29 ft/sec. The cross flowing reactor mass had a velocity of 12 ft/sec (assuming 50% slip between impeller tip velocity and fluid velocity). The velocity ratio (inlet velocity/reactor mass cross flow) was 2.4. The jet from nozzle 30 penetrates the reactor mass about 8 inches before blending completely in the cross flowing reactor mass.

Polymer was recovered in a propylene slurry and treated down stream to obtain dry polypropylene and recovery of unreacted propylene. The polymer was specification and presented no problems in the down stream processing steps. The nozzle did not foul and did not require shutdown of the unit. The reactor ran for a period of over 10 weeks between shutdowns and no fouling was observed on the nozzle.

The invention claimed is:

1. In a reactor for polymerization of alpha-olefins in liquid phase comprising a vessel having inlet means for reactants and cocatalysts, outlet means for polymer slurry, having one or more impeller means arrayed along a vertical shaft centrally positioned in said vessel and rotatable therein by power means wherein the improvement is the positioning of a solid cocatalyst slurry inlet means on substantially the same horizontal plane as the bottom impeller means and extending into said vessel toward said impeller for a distance of from about 30 to 80% of the distance from the vessel wall to the distal end of the impeller means.

2. The apparatus according to claim 1 wherein said reactor has a generally cylindrical configuration.

3. The apparatus according to claim 1 wherein there are a plurality of impeller means arrayed along said vertical shaft.

4. The apparatus according to claim 1 wherein said solid cocatalyst slurry inlet means is positioned radially to said vertical shaft.

5. In a process for the polymerization of alpha-olefins comprising contacting an alpha-olefin in liquid phase in a polymerization zone comprising a vessel having one or more impeller means arrayed along a centrally located rotating vertical shaft, in the presence of a Ziegler type catalyst, at a polymerization temperature and pressure wherein the improvement comprises introducing a slurry of solid cocatalyst through an inlet (1) below the surface of th liquid on substantially the horizontal plane of the bottom impeller (2) at a velocity at least two times the angular velocity of the distal end of said impeller and (3) at a distance of from about 30 to 80% of the distance from the vessel wall to the end of said impeller means, thereby dispersing and mixing said solid cocatalyst and eliminating fouling of said inlet.

6. The process according to claim 5 wherein the alpha-olefin comprises propylene.

7. The process according to claim 6 wherein the solid cocatalyst comprises a titanium compound.

8. The process according to claim 6 wherein the Ziegler type catalyst comprises a solid cocatalyst, a liquid alkyl aluminum chloride and a liquid modifier.

9. The process according to claim 6 wherein a portion of the propylene is introduced through the inlet with said solid cocatalyst.

10. The process according to claim 5 wherein the ratio of the solid cocatalyst slurry inlet velocity to the reactor mass cross flow velocity is in the range of 2 to 3:1.

11. The process according to claim 5 wherein the velocity of the cocatalyst is in the range of from two times to three times the angular velocity of the distal end of said impeller.

12. A method of eliminating fouling of the inlet of a solid Ziegler type catalyst component comprising introducing the solid Ziegler type catalyst component in a slurry into a liquid reaction mass of alpha-olefin under reaction conditions, below the surface of the liquid reaction mass, through an inlet on substantially the same horizontal plane as the bottom impeller of one or more impellers arrayed along a vertical shaft which shaft is centrally positioned in a vessel containing the reaction mass, at a velocity in the range of from two times to three times the angular velocity of the distal end of said impeller and at a distance of from about 30 to 80% of the distance from the vessel wall to the distal end of said impeller means.

* * * * *